US012683157B2

(12) United States Patent
Hayashi et al.

(10) Patent No.: US 12,683,157 B2
(45) Date of Patent: Jul. 14, 2026

(54) POSITIVE ELECTRODE MATERIAL AND BATTERY

(71) Applicant: Panasonic Intellectual Property Management Co., Ltd., Osaka (JP)

(72) Inventors: Yohei Hayashi, Osaka (JP); Akihiro Sakai, Nara (JP); Izuru Sasaki, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 56 days.

(21) Appl. No.: 18/444,615

(22) Filed: Feb. 16, 2024

(65) Prior Publication Data

US 2024/0194868 A1     Jun. 13, 2024

Related U.S. Application Data

(63) Continuation of application No. PCT/JP2022/027342, filed on Jul. 12, 2022.

(30) Foreign Application Priority Data

Sep. 1, 2021    (JP) ................................. 2021-142334

(51) Int. Cl.
H01M 4/525 (2010.01)
H01M 4/505 (2010.01)
(Continued)

(52) U.S. Cl.
CPC ........... H01M 4/525 (2013.01); H01M 4/505 (2013.01); H01M 10/052 (2013.01); H01M 10/0562 (2013.01); *H01M 2300/008* (2013.01)

(58) Field of Classification Search
CPC ................. H01M 4/525; H01M 4/505; H01M 2300/008; H01M 4/366
See application file for complete search history.

(56) References Cited

U.S. PATENT DOCUMENTS 10,547,055 B2    1/2020  Matsuda
11,524,902 B2    12/2022  Asano et al.
(Continued)

FOREIGN PATENT DOCUMENTS

CN        109873207 A      6/2019
CN        111201643 A      5/2020
(Continued)

OTHER PUBLICATIONS

International Search Report of PCT application No. PCT/JP2022/027342 dated Sep. 27, 2022.
(Continued)

*Primary Examiner* — Nicholas A Smith
*Assistant Examiner* — Ziheng Lu
(74) *Attorney, Agent, or Firm* — RIMON P.C.

(57) ABSTRACT

A positive electrode material includes a coated active material including a positive electrode active material and a coating layer and a first solid electrolyte. The coating layer contains a second solid electrolyte and covers at least a portion of a surface of the positive electrode active material. The first solid electrolyte is represented by the following Formula (1):

$$Li_{\alpha 1}M1_{\beta 1}X1_{\gamma 1} \qquad \text{Formula (1)}$$

where $\alpha 1$, $\beta 1$, and $\gamma 1$ each independently represent a positive real number; M1 includes calcium, yttrium, and at least one rare earth element other than yttrium; X1 includes at least one selected from the group consisting of F, Cl, Br, and I. The second solid electrolyte is softer than the first solid electrolyte.

15 Claims, 2 Drawing Sheets

100

(51) Int. Cl.
  *H01M 10/052* (2010.01)
  *H01M 10/0562* (2010.01)

(56) References Cited

U.S. PATENT DOCUMENTS

| | | | |
|---|---|---|---|
| 11,605,833 B2 | 3/2023 | Isojima et al. | |
| 11,637,315 B2 | 4/2023 | Ouspenski et al. | |
| 11,848,414 B2 | 12/2023 | Assat et al. | |
| 12,132,171 B2 | 10/2024 | Isohima et al. | |
| 12,288,844 B2 | 4/2025 | Kubo et al. | |
| 12,308,384 B2 | 5/2025 | Assat et al. | |
| 12,451,513 B2 | 10/2025 | Nishio et al. | |
| 12,525,642 B2 | 1/2026 | Nakama et al. | |
| 2009/0081554 A1 | 3/2009 | Takada et al. | |
| 2011/0027551 A1 | 2/2011 | Huang et al. | |
| 2011/0027661 A1* | 2/2011 | Okazaki | H01M 4/525 |
| | | | 29/623.5 |
| 2011/0057151 A1 | 3/2011 | Chen et al. | |
| 2014/0087270 A1 | 3/2014 | Yoshida | |
| 2016/0268661 A1 | 9/2016 | Kim et al. | |
| 2018/0090752 A1 | 3/2018 | Fujiki et al. | |
| 2019/0088949 A1 | 3/2019 | Makino et al. | |
| 2019/0088995 A1 | 3/2019 | Asano et al. | |
| 2019/0386322 A1 | 12/2019 | Yawata et al. | |
| 2020/0119362 A1 | 4/2020 | Furusawa et al. | |
| 2020/0127325 A1 | 4/2020 | Takahashi et al. | |
| 2020/0144575 A1* | 5/2020 | Ku | H01M 4/587 |
| 2020/0328453 A1* | 10/2020 | Sakai | H01M 10/0562 |
| 2020/0328459 A1 | 10/2020 | Sakai et al. | |
| 2020/0328460 A1* | 10/2020 | Asano | C01G 9/006 |
| 2020/0343554 A1 | 10/2020 | Oshima et al. | |
| 2020/0350615 A1 | 11/2020 | Sakaida et al. | |
| 2020/0350626 A1* | 11/2020 | Matsumura | H01M 4/525 |
| 2021/0184253 A1* | 6/2021 | Koga | H01B 1/10 |
| 2021/0218054 A1* | 7/2021 | Oshima | H01M 50/449 |
| 2021/0273259 A1 | 9/2021 | Nagamine et al. | |
| 2021/0328262 A1* | 10/2021 | Nishio | H01M 10/0525 |
| 2021/0376377 A1 | 12/2021 | Tanaka et al. | |
| 2022/0209291 A1* | 6/2022 | Kubo | H01M 4/62 |
| 2022/0246983 A1 | 8/2022 | Suzuki et al. | |
| 2022/0255125 A1 | 8/2022 | Suzuki et al. | |
| 2022/0285721 A1 | 9/2022 | Miyatake et al. | |
| 2022/0294008 A1 | 9/2022 | Kubo et al. | |
| 2022/0294012 A1 | 9/2022 | Kambara et al. | |
| 2022/0320571 A1 | 10/2022 | Hirano et al. | |
| 2022/0367845 A1 | 11/2022 | Sasaki et al. | |
| 2023/0163299 A1 | 5/2023 | Nagamine et al. | |
| 2024/0413385 A1 | 12/2024 | Ueno et al. | |
| 2026/0024806 A1 | 1/2026 | Nishio et al. | |

FOREIGN PATENT DOCUMENTS

| | | | | |
|---|---|---|---|---|
| CN | 112771626 A | 5/2021 | | |
| EP | 3467845 A1 | 4/2019 | | |
| EP | 4044291 A1 | 8/2022 | | |
| EP | 4084120 A1 | 11/2022 | | |
| EP | 4102594 A1 | 12/2022 | | |
| JP | 2016-139511 A | 8/2016 | | |
| WO | 2007/004590 A1 | 1/2007 | | |
| WO | 2015/144074 A1 | 10/2015 | | |
| WO | 2018/025582 | 2/2018 | | |
| WO | 2018/168505 A1 | 9/2018 | | |
| WO | 2019/135319 A1 | 7/2019 | | |
| WO | WO-2019135315 A1 * | 7/2019 | | H01M 4/366 |
| WO | WO-2019135343 A1 * | 7/2019 | | C01F 17/36 |
| WO | 2019/146218 A1 | 8/2019 | | |
| WO | WO-2019146236 A1 * | 8/2019 | | H01M 50/431 |
| WO | WO-2020100465 A1 * | 5/2020 | | H01M 10/0525 |
| WO | 2020/137026 A1 | 7/2020 | | |
| WO | WO-2020137189 A1 * | 7/2020 | | H01M 10/0562 |
| WO | WO-2020137391 A1 * | 7/2020 | | H01M 4/13 |
| WO | WO-2021070595 A1 * | 4/2021 | | C01F 17/36 |
| WO | 2021/131716 A1 | 7/2021 | | |
| WO | 2021/157361 A1 | 8/2021 | | |

OTHER PUBLICATIONS

Masahiro Tatsumisago et al., "All-solid-state lithium secondary batteries using sulfide-based glass-ceramic electrolytes", Journal of Power Sources 159(2006), May 24, 2006, pp. 193-199.

The EPC Office Action dated Sep. 9, 2025 for the related European Patent Application No. 22864061.1.

International Search Report issued on Mar. 9, 2021 in International Patent Application No. PCT/JP2020/045914, with English translation.

International Search Report of PCT application No. PCT/JP2021/025293 dated Aug. 24, 2021.

International Search Report of PCT application No. PCT/JP2021/025292 dated Aug. 31, 2021.

Extended European Search Report dated May 27, 2024 issued in the corresponding European Patent Application No. 20906558.0.

The EPC Office Action dated Jul. 3, 2024 for the related European Patent Application No. 21845968.3.

The EPC Office Action dated Jul. 3, 2024 for the related European Patent Application No. EP21846770.2.

Chinese Search Report dated Jun. 28, 2024 issued in the corresponding Chinese Patent Application No. 202080088589.9, with English translation.

Atsushi Sakuda et al., "Interfacial Observation between LiCoO2 Electrode and Li2S—P2S5 Solid Electrolytes of All-Solid-State Lithium Secondary Batteries Using Transmission Electron Microscopy", Chemistry of Materials, American Chemical Society, 2010, vol. 22, No. 3, Sep. 25, 2009, pp. 949-956.

A. Zevgolis et al., "Alloying Effects on Superionic Conductivity in Lithium Indium Halides for All-Solid-State Batteries", Applied Physics Letters Materials, Nov. 1, 2017, pp. 1-14.

Non-Final Office Action dated Feb. 6, 2025 issued in U.S. Appl. No. 17/842,546.

Non-Final Office Action dated Jul. 17, 2025 issued in U.S. Appl. No. 17/842,546.

Final Office Action dated Dec. 4, 2025 issued in U.S. Appl. No. 17/842,546.

Non-Final Office Action dated Jul. 23, 2025 issued in U.S. Appl. No. 18/153,364.

Non-Final Office Action dated Jul. 23, 2025 issued in U.S. Appl. No. 18/153,354.

Non-Final Office Action dated Aug. 7, 2025 issued in U.S. Appl. No. 18/153,354.

Non-Final Office Action dated Nov. 26, 2025 issued in U.S. Appl. No. 18/153,354.

Notice of Allowance dated Dec. 9, 2025 issued in U.S. Appl. No. 18/153,364.

Search Report dated Jan. 13, 2026 for the corresponding Chinese Patent Application No. 202180061394.X, with English translation.

Notice of Allowance dated Feb. 2, 2026 issued in related U.S. Appl. No. 17/842,546.

Non-Final Office Action dated Dec. 29, 2025 issued in related U.S. Appl. No. 18/153,354.

* cited by examiner

POSITIVE ELECTRODE MATERIAL AND BATTERY

BACKGROUND

1. Technical Field

The present disclosure relates to a positive electrode material and a battery.

2. Description of the Related Art

International Publication No. 2018/025582 discloses a battery in which a halide is used as a solid electrolyte.

Journal of Power Sources 159 (2006), p 193-199 discloses a battery in which a sulfide is used as a solid electrolyte.

SUMMARY

In the related art, it is desirable to decrease the interfacial resistance of a battery.

In one general aspect, the techniques disclosed here feature a positive electrode material according to an aspect of the present disclosure includes a coated active material including a positive electrode active material and a coating layer, and a first solid electrolyte, wherein the coating layer contains a second solid electrolyte and covers at least a portion of a surface of the positive electrode active material, the first solid electrolyte is represented by the following Formula (1):

$$\text{Li}_{\alpha 1}\text{M1}_{\beta 1}\text{X1}_{\gamma 1} \qquad \text{Formula (1)}$$

where $\alpha 1$, $\beta 1$, and $\gamma 1$ each independently represent a positive real number, M1 includes calcium, yttrium, and at least one rare earth element other than yttrium, X1 includes at least one selected from the group consisting of F, Cl, Br, and I, and the second solid electrolyte is softer than the first solid electrolyte.

According to the present disclosure, the interfacial resistance of a battery may be decreased.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
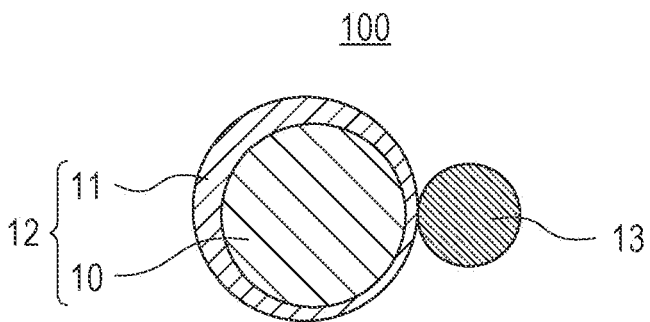
FIG. 1 is a schematic sectional view illustrating the configuration of a positive electrode material according to a first embodiment.

Underlying Knowledge Forming Basis of the Present Disclosure

International Publication No. 2018/025582 discloses a battery including a positive electrode containing a halide solid electrolyte. The halide solid electrolyte has high ionic conductivity.

Meanwhile, the present inventors performed intensive investigations and, as a result, found that a contact state between a positive electrode active material and a halide solid electrolyte in a positive electrode relates to the interfacial resistance of a battery. The interfacial resistance of a battery is increased with decreasing the contact area between a positive electrode active material and a solid electrolyte. Further, the present inventors conjectured that the above-described contact area changes in accordance with the hardness of the solid electrolyte. For example, when the solid electrolyte is hard, the contact area between the positive electrode active material and the solid electrolyte is decreased, and the interfacial resistance of the battery is increased.

From these findings, the present inventors conceived the technology of the present disclosure.

SUMMARY OF ASPECTS OF THE PRESENT DISCLOSURE

A positive electrode material according to a first aspect of the present disclosure includes a coated active material including a positive electrode active material and a coating layer, and a first solid electrolyte, wherein the coating layer contains a second solid electrolyte and covers at least a portion of a surface of the positive electrode active material, the first solid electrolyte is represented by the following Formula (1):

$$\text{Li}_{\alpha 1}\text{M1}_{\beta 1}\text{X1}_{\gamma 1} \qquad \text{Formula (1)}$$

where $\alpha 1$, $\beta 1$, and $\gamma 1$ each independently represent a positive real number, M1 includes calcium, yttrium, and at least one rare earth element other than yttrium, X1 includes at least one selected from the group consisting of F, Cl, Br, and I, and the second solid electrolyte is softer than the first solid electrolyte.

According to the above-described configuration, the coating layer containing the second solid electrolyte plays the role of a paste which bonds the first solid electrolyte to the positive electrode active material. Consequently, the contact area between the positive electrode active material and the first solid electrolyte is increased. As a result, the interfacial resistance of the battery may be decreased.

Regarding a second aspect of the present disclosure, for example, the first solid electrolyte in the positive electrode material according to the first aspect may be represented by the following Formula (2):

$$\text{Li}_{6-2a-3d}\text{Ca}_a(\text{Y}_{1-b}\text{Gd}_b)_d\text{Br}_{6-c}\text{Cl}_c \qquad \text{Formula (2)}$$

wherein Formula (2) satisfies $0<a<0.75$, $0<b<1$, $0<c<6$, and $0<d<1.5$. According to the above-described configuration, the interfacial resistance of the battery may be further decreased.

Regarding a third aspect of the present disclosure, for example, in the positive electrode material according to the second aspect, Formula (2) may satisfy $0.01 \leq a \leq 0.3$. According to the above-described configuration, the interfacial resistance of the battery may be further decreased.

Regarding a fourth aspect of the present disclosure, for example, in the positive electrode material according to the third aspect, Formula (2) may satisfy $a \leq 0.2$. According to the above-described configuration, the interfacial resistance of the battery may be further decreased.

Regarding a fifth aspect of the present disclosure, for example, in the positive electrode material according to any one of the second aspect to the fourth aspect, Formula (2) may satisfy $0.1 \leq b \leq 0.9$. According to the above-described configuration, the interfacial resistance of the battery may be further decreased.

Regarding a sixth aspect of the present disclosure, for example, in the positive electrode material according to any one of the second aspect to the fourth aspect, Formula (2) may satisfy $0.8 \leq b < 1$. According to the above-described configuration, the interfacial resistance of the battery may be further decreased.

Regarding a seventh aspect of the present disclosure, for example, in the positive electrode material according to any one of the second aspect to the sixth aspect, Formula (2) may satisfy $1.0 \leq c \leq 1.2$. According to the above-described configuration, the interfacial resistance of the battery may be further decreased.

Regarding an eighth aspect of the present disclosure, for example, in the positive electrode material according to any one of the first aspect to the seventh aspect, Young's modulus of the second solid electrolyte may be lower than or equal to 40 GPa. According to the above-described configuration, the interfacial resistance of the battery may be further decreased.

Regarding a ninth aspect of the present disclosure, for example, in the positive electrode material according to any one of the first aspect to the eighth aspect, the second solid electrolyte may be represented by the following Formula (3):

$$Li_{\delta 1}M2_{\epsilon 1}X2_{\zeta 1} \qquad \text{Formula (3)}$$

where $\delta 1$, $\epsilon 1$, and $\zeta 1$ each independently represent a positive real number, M2 includes at least one element selected from the group consisting of semimetal elements and metal elements other than Li, and X2 includes at least one selected from the group consisting of F, Cl, Br, and I.

When a sulfide solid electrolyte disclosed in Journal of Power Sources 159 (2006), p 193-199 is in contact with the positive electrode active material, the sulfide solid electrolyte may undergo oxidative decomposition during charge of a battery. The oxidative decomposition of the solid electrolyte increases the interfacial resistance of the battery. The second solid electrolyte represented by Formula (3) has excellent oxidation stability and, therefore, does not readily undergo oxidative decomposition due to contact with the positive electrode active material. Consequently, the interfacial resistance of the battery may be further decreased.

Regarding a tenth aspect of the present disclosure, for example, in the positive electrode material according to the ninth aspect, the second solid electrolyte may be represented by the following Formula (4):

$$Li_{3-3e}Y_{1+e}Cl_{6-f-g}Br_f I_g \qquad \text{Formula (4)}$$

wherein Formula (4) satisfies $-1 < e < 1$, $0 \leq f \leq 6$, $0 \leq g \leq 6$, and $(f+g) \leq 6$. According to the above-described configuration, the interfacial resistance of the battery may be further decreased.

Regarding an eleventh aspect of the present disclosure, for example, in the positive electrode material according to the tenth aspect, Formula (4) may satisfy $2 \leq f \leq 3$ and $g=0$. According to the above-described configuration, the interfacial resistance of the battery may be further decreased.

Regarding a twelfth aspect of the present disclosure, for example, in the positive electrode material according to the tenth aspect, Formula (4) may satisfy $f=0$ and $g=0$. According to the above-described configuration, the interfacial resistance of the battery may be further decreased.

Regarding a thirteenth aspect of the present disclosure, for example, in the positive electrode material according to any one of the tenth aspect to the twelfth aspect, Formula (4) may satisfy $0 \leq e \leq 0.1$. According to the above-described configuration, the interfacial resistance of the battery may be further decreased.

Regarding a fourteenth aspect of the present disclosure, for example, in the positive electrode material according to any one of the first aspect to the thirteenth aspect, the positive electrode active material may contain Ni, Co, and Mn or Al. According to the above-described configuration, the energy density of the battery may be improved.

A battery according to a fifteenth aspect of the present disclosure includes
    a positive electrode containing the positive electrode material according to any one of the first aspect to the fourteenth aspect,
    a negative electrode, and
    an electrolyte layer disposed between the positive electrode and the negative electrode.

According to the above-described configuration, the interfacial resistance of the battery may be decreased.

The embodiments according to the present disclosure will be described below with reference to the drawings.

First Embodiment

FIG. 1 is a schematic sectional view illustrating the configuration of a positive electrode material 100 according to a first embodiment. The positive electrode material 100 contains a coated active material 12 and a first solid electrolyte 13.

Coated Active Material

The coated active material 12 includes a positive electrode active material 10 and a coating layer 11. The coating layer 11 covers at least a portion of the surface of the positive electrode active material 10.

The coating layer 11 is in direct contact with the positive electrode active material 10.

Hereafter, the material constituting the coating layer 11 is referred to as "coating material". The coated active material 12 includes the positive electrode active material 10 and the coating material. The coating layer 11 is formed by the coating material being present on at least a portion of the surface of the positive electrode active material 10.

Coating Layer

The coating layer 11 contains a second solid electrolyte. The second solid electrolyte is softer than the first solid electrolyte 13. The coating layer 11 containing the second solid electrolyte plays the role of a paste which bonds the first solid electrolyte 13 to the positive electrode active material 10. Consequently, the contact area between the positive electrode active material 10 and the first solid electrolyte 13 is increased. As a result, the interfacial resistance of the battery may be decreased.

The coating layer 11 may contain only the second solid electrolyte. "Contain only the second solid electrolyte" means that materials other than the second solid electrolyte except for incidental impurities are not intentionally added. For example, raw materials for the second solid electrolyte, by-products generated during production of the second solid electrolyte, and the like are included in incidental impurities.

In the present disclosure, "soft" means that, for example, Young's modulus is low. Young's modulus may be measured at room temperature (25° C.).

Young's modulus of the second solid electrolyte is lower than Young's modulus of the first solid electrolyte 13. For example, Young's modulus of the second solid electrolyte may be lower than or equal to 40 GPa. According to the above-described configuration, the contact area between the positive electrode active material 10 and the first solid electrolyte 13 is increased. As a result, the interfacial resistance of the battery may be decreased.

Young's modulus of the second solid electrolyte may be less than or equal to 20 GPa. There is no particular limitation regarding the lower limit of Young's modulus of the second solid electrolyte. The lower limit of Young's modulus of the second solid electrolyte is, for example, 5 GPa.

Young's modulus of the second solid electrolyte can be calculated by, for example, using a nanoindenter and acquiring a load-displacement curve of particles. In this regard, when a measurement by using the nanoindenter is difficult, Young's modulus of the second solid electrolyte can be calculated by using an ultrasonic vibrator and measuring the acoustic wave propagation velocity in the interior of a molded body.

In the present embodiment, the second solid electrolyte is a halide solid electrolyte. The halide solid electrolyte has high ionic conductivity and excellent high-potential stability. Further, the halide solid electrolyte has low electron conductivity and high oxidation resistance. Therefore, the second solid electrolyte being the halide solid electrolyte enables the charge-discharge characteristics of the battery to be further improved and enables the reaction overpotential of the battery to be suppressed from further increasing. The halide solid electrolyte is a solid electrolyte containing halogen.

When a sulfide solid electrolyte disclosed in Journal of Power Sources 159 (2006), p 193-199 is in contact with the positive electrode active material, the sulfide solid electrolyte may undergo oxidative decomposition during charge of the battery. The oxidative decomposition of the solid electrolyte increases the interfacial resistance of the battery. The halide solid electrolyte has excellent oxidation stability and, therefore, does not readily undergo oxidative decomposition due to contact with the positive electrode active material. Consequently, when the second solid electrolyte is a halide solid electrolyte, the interfacial resistance of the battery may be further decreased.

The second solid electrolyte may be a halide solid electrolyte represented by the following Formula (3):

$$Li_{\delta 1}M2_{\epsilon 1}X2_{\zeta 1} \qquad \text{Formula (3)}$$

where $\delta 1$, $\epsilon 1$, and $\zeta 1$ each independently represent a positive real number. M2 includes at least one selected from the group consisting of semimetal elements and metal elements other than Li. X2 includes at least one selected from the group consisting of F, Cl, Br, and I. According to the above-described configuration, the ionic conductivity of the second solid electrolyte is further improved. Consequently, the interfacial resistance of the battery may be further decreased.

In the present disclosure, "semimetal elements" include B, Si, Ge, As, Sb, and Te. "Metal elements" include all elements in group I to group XII of the periodic table other than hydrogen and all elements of group XIII to group XVI other than B, Si, Ge, As, Sb, Te, C, N, P, O, S, and Se. That is, "semimetal elements" or "metal elements" are a group of elements, each of which can become a cation when the element and a halogen compound form an inorganic compound.

The second solid electrolyte may be represented by the following Formula (4):

$$Li_{3-3e}Y_{1+e}Cl_{6-f-g}Br_fI_g \qquad \text{Formula (4)}$$

wherein Formula (4) satisfies $-1<e<1$, $0\le f\le 6$, $0\le g\le 6$, and $(f+g)\le 6$. According to the above-described configuration, the ionic conductivity of the second solid electrolyte is further improved. Consequently, the interfacial resistance of the battery may be further decreased.

Formula (4) may satisfy $2\le f\le 3$ and $g=0$. According to the above-described configuration, the ionic conductivity of the second solid electrolyte may be further improved. Consequently, the interfacial resistance of the battery may be further decreased.

Formula (4) may satisfy $f=0$ and $g=0$. According to the above-described configuration, the ionic conductivity of the second solid electrolyte is further improved. Consequently, the interfacial resistance of the battery may be further decreased.

Formula (4) may satisfy $0\le e\le 0.1$. According to the above-described configuration, the ionic conductivity of the second solid electrolyte is further improved. Consequently, the interfacial resistance of the battery may be further decreased.

The second solid electrolyte may be represented by the following Formula (A1):

$$Li_{3-3e}Y_{1+e}X2_6 \qquad \text{Formula (A1)}$$

where X2 includes at least one selected from the group consisting of F, Cl, Br, and I. Formula (A1) satisfies $-1<e<1$. According to the above-described configuration, the ionic conductivity of the second solid electrolyte is further improved. Consequently, the interfacial resistance of the battery may be further decreased.

The second solid electrolyte may be represented by the following Formula (A2):

$$Li_3YX2_6 \qquad \text{Formula (A2)}$$

where X2 includes at least one selected from the group consisting of F, Cl, Br, and I. According to the above-described configuration, the ionic conductivity of the second solid electrolyte is further improved. Consequently, the interfacial resistance of the battery may be further decreased.

The second solid electrolyte may be represented by the following Formula (A3):

$$Li_{3-3e+h}Y_{1+e-h}M3_hCl_{6-f-g}Br_fI_g \qquad \text{Formula (A3)}$$

where M3 includes at least one selected from the group consisting of Mg, Ca, Sr, Ba, and Zn. Formula (A3) satisfies $-1<e<2$, $0<h<3$, $0<(3-3e+h)$, $0<(1+e-h)$, $0\le f\le 6$, $0\le g\le 6$, and $(f+g)\le 6$. According to the above-described configuration, the ionic conductivity of the second solid electrolyte is further improved. Consequently, the interfacial resistance of the battery may be further decreased.

The second solid electrolyte may be represented by the following Formula (A4):

$$Li_{3-3e}Y_{1+e-i}M4_iCl_{6-f-g}Br_fI_g \qquad \text{Formula (A4)}$$

where M4 includes at least one selected from the group consisting of Al, Sc, Ga, and Bi. Formula (A4) satisfies $-1<e<1$, $0<i<2$, $0<(1+e-i)$, $0\le f\le 6$, $0\le g\le 6$, and $(f+g)\le 6$. According to the above-described configuration, the ionic conductivity of the second solid electrolyte is further improved. Consequently, the interfacial resistance of the battery may be further decreased.

The second solid electrolyte may be represented by the following Formula (A5):

$$Li_{3-3e-j}Y_{1+e-j}M5_jCl_{6-f-g}Br_fI_g \qquad \text{Formula (A5)}$$

where M5 includes at least one selected from the group consisting of Zr, Hf, and Ti. Formula (A5) satisfies $-1<e<1$, $0<j<1.5$, $0<(3-3e-j)$, $0<(1+e-j)$, $0\le f\le 6$, $0\le g\le 6$, and $(f+g)\le 6$. According to the above-described configuration, the ionic conductivity of the second solid electrolyte is further improved. Consequently, the interfacial resistance of the battery may be further decreased.

The second solid electrolyte may be represented by the following Formula (A6):

$$Li_{3-3e-2k}Y_{1+e-k}M6_kCl_{6-f-g}Br_fI_g \qquad \text{Formula (A6)}$$

where M6 includes at least one selected from the group consisting of Ta and Nb. Formula (A6) satisfies $-1<e<1$, $0<k<1.2$, $0<(3-3e-2k)$, $0<(1+e-k)$, $0\le f\le 6$, $0\le g\le 6$, and $(f+g)\le 6$. According to the above-described configuration, the ionic conductivity of the second solid electrolyte is further improved. Consequently, the interfacial resistance of the battery may be further decreased.

Regarding the second solid electrolyte, for example, $Li_3YX2_6$, $Li_2MgX2_4$, $Li_2FeX2_4$, $Li(Al,Ga,In)X2_4$, $Li_3(Al,Ga,In)X2_6$, and the like may be used. Herein, X2 represents at least one selected from the group consisting of F, Cl, Br, and I.

In the present disclosure, the expression "(A,B,C)" in the formula means "at least one selected from the group consisting of A, B, and C". For example, "(Al,Ga,In)" is synonymous with "at least one selected from the group consisting of Al, Ga, and In".

A typical composition of $Li_3YX2_6$ is, for example, $Li_3YBr_2Cl_4$. The second solid electrolyte may contain $Li_3YBr_2Cl_4$. According to the above-described configuration, the ionic conductivity of the second solid electrolyte is further improved. Consequently, the interfacial resistance of the battery may be further decreased.

The positive electrode active material 10 may be separated from the first solid electrolyte 13 due to the coating layer 11. The positive electrode active material 10 is not necessarily in direct contact with the first solid electrolyte 13 since the coating layer 11 has ionic conductivity.

The coating layer 11 may uniformly cover the positive electrode active material 10. According to the above-described configuration, the contact area between the positive electrode active material 10 and the first solid electrolyte 13 is increased. Consequently, the interfacial resistance of the battery may be further decreased.

The coating layer 11 may cover only a portion of the surface of the positive electrode active material 10. Particles of the positive electrode active material 10 being in direct contact with each other through a portion not coated with the coating layer 11 improves the electron conductivity between the particles of the positive electrode active material 10. As a result, the battery can function with a high output.

The coating layer 11 may cover greater than or equal to 30% of the surface of the positive electrode active material 10, may cover greater than or equal to 60%, or may cover greater than or equal to 90%. The coating layer 11 may cover substantially the entire surface of the positive electrode active material 10.

The coating layer 11 covering the positive electrode active material 10 suppresses an oxide film being formed due to oxidative decomposition of other solid electrolytes during charge of the battery. As a result, the interfacial resistance of the battery may be further decreased.

In the present embodiment, the coating layer 11 is a single layer. According to the above-described configuration, the production cost of the coated active material layer 12 can be suppressed from being increased, and, in addition, predetermined effects are readily obtained.

The coating layer 11 may be composed of a plurality of layers. In such an instance, at least one of the plurality of layers may contain the second solid electrolyte. Each of the plurality of layers may contain the second solid electrolyte.

The thickness of the coating layer 11 may be, for example, greater than or equal to 1 nm and less than or equal to 500 nm.

The thickness of the coating layer 11 being greater than or equal to 1 nm enables the contact area between the positive electrode active material 10 and the first solid electrolyte 13 to be sufficiently ensured. Consequently, the interfacial resistance of the battery may be further decreased.

In addition, the thickness of the coating layer 11 being less than or equal to 500 nm enables the interfacial resistance of the battery due to the thickness of the coating layer 11 to be sufficiently decreased.

There is no particular limitation regarding the method for measuring the thickness of the coating layer 11. For example, the thickness of the coating layer 11 can be determined through direct observation by using a transmission electron microscope or the like. Alternatively, XPS measurement is performed while the coating layer 11 is being removed by Ar sputtering, and the thickness of the coating layer 11 can be determined from a change in the spectrum derived from the active material.

Positive Electrode Active Material

The positive electrode active material 10 contains a material having characteristics of occluding and releasing metal ions. The metal ion is, for example, a lithium ion. Regarding the positive electrode active material 10, for example, lithium-containing transition metal oxides, transition metal fluorides, polyanionic materials, fluorinated polyanionic materials, transition metal sulfides, transition metal oxysulfides, and transition metal oxynitrides may be used. In particular, a lithium-containing transition metal oxide being used as the positive electrode active material 10 enables the production cost to be decreased and enables the average discharge voltage to be increased. Examples of the lithium-containing transition metal oxide include $Li(Ni,Co,Al)O_2$, $Li(Ni,Co,Mn)O_2$, and $LiCoO_2$.

The positive electrode active material 10 may contain Ni, Co, and Mn. The positive electrode active material 10 may contain lithium nickel cobalt manganese oxide (that is, NCM). The positive electrode active material 10 may be NCM. For example, the positive electrode active material 10 may be $Li(Ni,Co,Mn)O_2$. Alternatively, the positive electrode active material 10 may contain Ni, Co, and Al. The positive electrode active material 10 may contain lithium nickel cobalt aluminum oxide (that is, NCA). The positive electrode active material 10 may be NCA. For example, the positive electrode active material 10 may be $Li(Ni,Co,Al)O_2$. According to the above-described configuration, the energy density of the battery can be further increased.

There is no particular limitation regarding the shape of the positive electrode active material 10. The shape of the positive electrode active material 10 may be, for example, needlelike, spherical, ellipsoidal, or the like. For example, the shape of the positive electrode active material 10 may be granular.

First Solid Electrolyte

The first solid electrolyte 13 contains a material having high ionic conductivity. According to the first solid electrolyte 13, high ionic conductivity can be realized in a positive electrode material 100.

In the present embodiment, the first solid electrolyte 13 is a halide solid electrolyte represented by the following Formula (1):

$$Li_{\alpha 1}M1_{\beta 1}X1_{\gamma 1} \qquad \text{Formula (1)}$$

where $\alpha 1$, $\beta 1$, and $\gamma 1$ each independently represent a positive real number. M1 includes calcium, yttrium, and at least one rare earth element other than yttrium. X1 includes at least one selected from the group consisting of F, Cl, Br, and I.

The halide solid electrolyte represented by Formula (1) has high ionic conductivity compared with a halide solid electrolyte such as LiI composed of Li and a halogen element. Consequently, the output characteristics of the battery may be improved.

In Formula (1), examples of the at least one rare earth element other than yttrium represented by M1 include Sc, La, Ce, Pr, Nd, Pm, Sm, Eu, Gd, Tb, Dy, Ho, Er, Tm, Yb, and Lu. Since chemical properties of rare earth elements are similar to each other, each of the above-described elements can be used as a constituent element of the halide solid electrolyte according to the present embodiment.

In Formula (1), M1 may represent only the rare earth element other than yttrium.

The first solid electrolyte 13 may be represented by the following Formula (2):

$$Li_{6-2a-3d}Ca_a(Y_{1-b}Gd_b)_dBr_{6-c}Cl_c \qquad \text{Formula (2)}$$

wherein Formula (2) satisfies $0 < a < 0.75$, $0 < b < 1$, $0 < c < 6$, and $0 < d < 1.5$. According to the above-described configuration, the ionic conductivity of the first solid electrolyte 13 is further improved. Consequently, the interfacial resistance of the battery may be further decreased.

Formula (2) may satisfy $0.01 \leq a \leq 0.3$. According to the above-described configuration, the ionic conductivity of the first solid electrolyte 13 is further improved. Consequently, the interfacial resistance of the battery may be further decreased.

Formula (2) may satisfy $a \leq 0.2$. According to the above-described configuration, the ionic conductivity of the first solid electrolyte 13 is further improved. Consequently, the interfacial resistance of the battery may be further decreased.

Formula (2) may satisfy $0.1 \leq b \leq 0.9$. According to the above-described configuration, the ionic conductivity of the first solid electrolyte 13 is further improved. Consequently, the interfacial resistance of the battery may be further decreased.

Formula (2) may satisfy $0.8 \leq b < 1$. According to the above-described configuration, the ionic conductivity of the first solid electrolyte 13 is further improved. Consequently, the interfacial resistance of the battery may be further decreased.

Formula (2) may satisfy $1.0 \leq c \leq 1.2$. According to the above-described configuration, the ionic conductivity of the first solid electrolyte 13 is further improved. Consequently, the interfacial resistance of the battery may be further decreased.

The halide solid electrolyte usable as the first solid electrolyte 13 and the second solid electrolyte may contain an oxygen atom as an anion other than a halogen element.

The halide solid electrolyte usable as the first solid electrolyte 13 and the second solid electrolyte is not necessarily containing sulfur. According to the above-described configuration, hydrogen sulfide gas is suppressed from being generated. Consequently, improved safety of a battery can be realized.

Young's modulus of the first solid electrolyte 13 is higher than Young's modulus of the second solid electrolyte. For example, Young's modulus of the first solid electrolyte 13 may be higher than 40 GPa.

There is no particular limitation regarding the upper limit of Young's modulus of the first solid electrolyte 13. The upper limit of Young's modulus of the first solid electrolyte 13 is, for example, 80 GPa.

When Young's modulus of the first solid electrolyte 13 is defined as Y1, and Young's modulus of the second solid electrolyte is defined as Y2, $1 \leq Y1/Y2 \leq 9$ may be satisfied, or $2 \leq Y1/Y2 \leq 4$ may be satisfied. When Y1/Y2 satisfies the above-described numerical range, the contact area between the positive electrode active material 10 and the first solid electrolyte 13 is increased.

Young's modulus of the first solid electrolyte 13 can be determined by the method akin to that described with respect to Young's modulus of the second solid electrolyte. It is conjectured that there is no difference in Young's modulus of the first solid electrolyte 13 between when the measurement is performed in the state of a powder and when the measurement is performed in the state of a positive electrode containing the positive electrode material 100.

There is no particular limitation regarding the shape of the first solid electrolyte 13. The shape of the first solid electrolyte 13 may be, for example, needlelike, spherical, ellipsoidal, or the like. For example, the shape of the first solid electrolyte 13 may be granular.

For example, when the shape of the first solid electrolyte 13 is granular (for example, spherical), the median diameter of the first solid electrolyte 13 may be less than or equal to 100 μm. The median diameter of the first solid electrolyte 13 being less than or equal to 100 μm enables the coated active material 12 and the first solid electrolyte 13 to form a favorable dispersion state in the positive electrode material 100. Consequently, the charge-discharge characteristics of the battery are improved.

The median diameter of the first solid electrolyte 13 may be less than or equal to 10 μm. According to the above-described configuration, the coated active material 12 and the first solid electrolyte 13 can form a favorable dispersion state in the positive electrode material 100.

The median diameter of the first solid electrolyte 13 may be less than the median diameter of the coated active material 12. According to the above-described configuration, the coated active material 12 and the first solid electrolyte 13 can form a more favorable dispersion state in the positive electrode material 100.

The median diameter of the coated active material 12 may be greater than or equal to 0.1 μm and less than or equal to 100 μm. The median diameter of the coated active material 12 being greater than or equal to 0.1 μm enables the coated active material 12 and the first solid electrolyte 13 to form a favorable dispersion state in the positive electrode material 100. Consequently, the charge-discharge characteristics of the battery are improved. The median diameter of the coated active material 12 being less than or equal to 100 μm sufficiently ensures the diffusion rate of lithium in the coated active material 12. Consequently, the battery can function with a high output.

The median diameter of the coated active material 12 may be greater than the median diameter of the first solid electrolyte 13. Consequently, the coated active material 12 and the first solid electrolyte 13 can form a favorable dispersion state.

In the present disclosure, the median diameter means a particle diameter (d50) when a cumulative volume is equal to 50% in the particle size distribution on a volume basis. The particle size distribution on a volume basis may be measured using, for example, a laser diffraction type measuring apparatus or an image analyzer.

At least a portion of the surface of the positive electrode active material 10 may be coated with a coating material different from the coating material constituting the coating layer 11. Examples of such a coating material include oxide solid electrolytes. Examples of the oxide solid electrolyte include Li—Nb—O compounds such as $LiNbO_3$, Li—B—O compounds such as $LiBO_2$ and $Li_3BO_3$, Li—Al—O compounds such as $LiAlO_2$, Li—Si—O compounds such as $Li_4SiO_4$, $Li_2SO_4$, Li—Ti—O compounds such as $Li_4Ti_5O_{12}$, Li—Zr—O compounds, such as $Li_2ZrO_3$, Li—Mo—O compounds such as $Li_2MoO_3$, Li-V-O compounds such as $LiV_2O_5$, Li—W—O compounds such as $Li_2WO_4$, and Li—P—O compounds such as $Li_3PO_4$. According to the above-described configuration, the first solid electrolyte 13 is suppressed from being oxidized in the positive electrode material 100.

In the positive electrode material 100, the coated active material 12 and the first solid electrolyte 13 may be in contact with each other. In such an instance, the coating layer 11 and the positive electrode active material 10 are in contact with each other.

The positive electrode material 100 may include a plurality of particles of the coated active material 12 and a plurality of particles of the first solid electrolyte 13.

In the positive electrode material 100, the content of the coated active material 12 and the content of the first solid electrolyte 13 may be the same or may differ from each other.

First Solid Electrolyte and Second Solid Electrolyte Producing Method

The first solid electrolyte 13 and the second solid electrolyte contained in the coating layer 11 may be produced by, for example, the following method.

Raw material powders are prepared at a mixing ratio suitable for an intended composition and then mixed. Examples of the raw material powder include oxides, hydroxides, halides, and acid halides. For example, when $Li_3YCl_6$ is to be produced, LiCl and $YCl_3$ that are raw material powders for a binary halide are prepared at a molar ratio of 3:1.

In such an instance, "M1" and "X1" in the above-described formula representing the first solid electrolyte 13 can be determined by selecting the type of the raw material powders. In addition, values of "α1", "β1", "γ1", "a", "b", "c", and "d" in the above-described formula representing the first solid electrolyte 13 can be adjusted by adjusting the type and the mixing ratio of the raw material powders and a synthesis process. "M2" and "X2" in the above-described formula representing the second solid electrolyte can be determined by selecting the type of the raw material powders. In addition, values of "δ1", "ε1", "ζ1", "e", "f", "g", "h", "i", "j", and "k" in the above-described formula representing the second solid electrolyte can be adjusted by adjusting the type and the mixing ratio of the raw material powders and a synthesis process.

After the raw material powders are sufficiently mixed, the raw material powders are mixed, pulverized, and reacted with each other by using a method of mechanochemical milling. Alternatively, after the raw material powders are sufficiently mixed, heat treatment may be performed in a vacuum. Consequently, the first solid electrolyte 13 and the second solid electrolyte are obtained.

The configuration of crystal phases (that is, crystal structures) in the first solid electrolyte 13 and the second solid electrolyte can be determined by adjusting the reaction method and the reaction condition between the raw material powders.

Coated Active Material Producing Method

The coated active material 12 may be produced by, for example, the following method.

A powder of the second solid electrolyte is prepared as a coating material. A mixture is obtained by mixing a powder of the positive electrode active material 10 and the powder of the coating material at an appropriate ratio. The mixture is subjected to milling treatment so that the mixture is provided with mechanical energy. A mixing apparatus such as a ball mill can be used for the milling treatment. To suppress the material from being oxidized, the milling treatment may be performed in a dry and inert atmosphere.

The coated active material 12 may be produced by a dry particle composing method. The treatment by the dry particle composing method includes providing the positive electrode active material 10 and the coating material with at least one mechanical energy selected from the group consisting of impact, compression, and shear. The positive electrode active material 10 and the coating material are mixed at an appropriate ratio.

There is no particular limitation regarding the apparatus used in the producing method of the coated active material 12, and the apparatus may be an apparatus capable of providing the mixture of the positive electrode active material 10 and the coating material with the mechanical energy of impact, compression, and shear. Examples of the apparatus capable of providing the mechanical energy include compression shear type processing apparatuses (particle composing apparatuses) such as a ball mill, "MECHANO FUSION" (produced by Hosokawa Micron Corporation), and "NOBILTA" (produced by Hosokawa Micron Corporation).

"MECHANO FUSION" is a particle composing apparatus by using a dry mechanical composing technology based on application of high mechanical energy to a plurality of raw material particles that differ from each other. In MECHANO FUSION, the particles form a composite due to the raw material powders introduced between the rotating container and a press head being provided with the mechanical energy of compression, shear, and friction.

"NOBILTA" is a particle composing apparatus by using a dry mechanical composing technology which is a particle composing technology developed to perform composing by using a nanoparticle as a raw material. NOBILTA produces a composite particle by providing the plurality of raw material powders with the mechanical energy of impact, compression, and shear.

Regarding "NOBILTA", in a horizontal and cylindrical mixing container, a rotor disposed having a predetermined gap between the rotor and the inner wall of the mixing container is rotated at a high speed, and treatment to forcedly pass the raw material powders through the gap is repeated a plurality of times. Consequently, force of impact, compression, and shear is applied to the mixture, and the composite particle of the positive electrode active material 10 and the coating material can be produced. The conditions such as the rotational speed of the rotor, the treatment time, and the amount of charge can be controlled as appropriate.

Positive Electrode Material Producing Method

The positive electrode material 100 is obtained by mixing the coated active material 12 and the first solid electrolyte 13. There is no particular limitation regarding the method for mixing the coated active material 12 and the first solid electrolyte 13. For example, the coated active material 12 and the first solid electrolyte 13 may be mixed by using an instrument such as a mortar, or the coated active material 12 and the first solid electrolyte 13 may be mixed by using a mixing apparatus such as a ball mill. There is no particular limitation regarding the mixing ratio of the coated active material 12 and the first solid electrolyte 13.

Second Embodiment

A second embodiment will be described below. Explanations overlapping with those of the first embodiment are omitted as appropriate.

Figure 2:
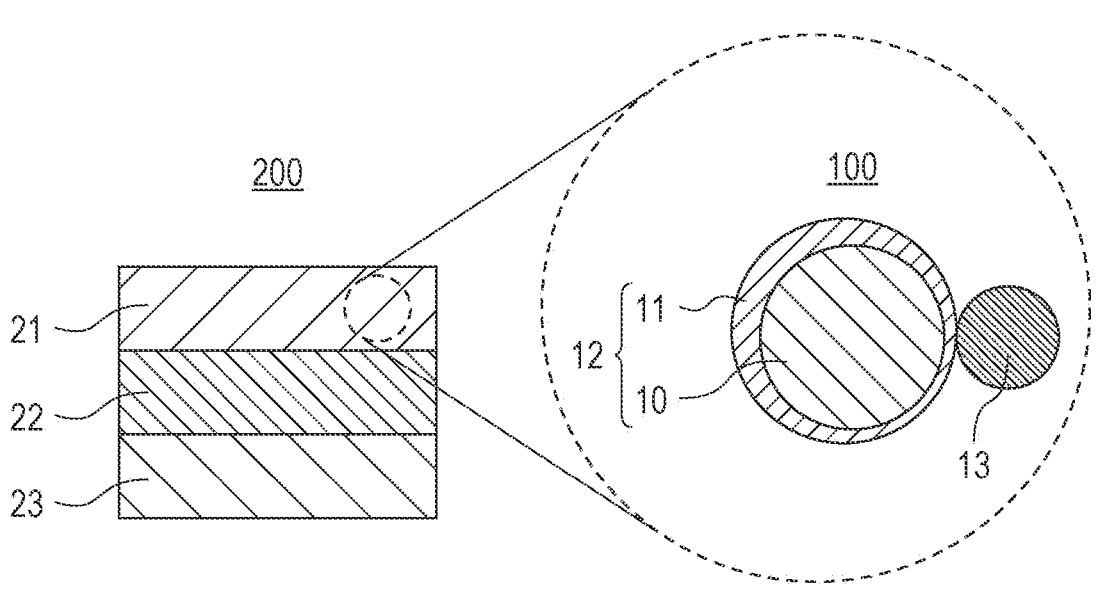
FIG. 2 is a schematic sectional view illustrating the configuration of a battery according to a second embodiment.

FIG. 2 is a schematic sectional view illustrating the configuration of a battery 200 according to a second embodiment.

The battery 200 according to the second embodiment includes a positive electrode 21, an electrolyte layer 22, and a negative electrode 23. The positive electrode 21 contains the positive electrode material 100 according to the first embodiment. The electrolyte layer 22 is disposed between the positive electrode 21 and the negative electrode 23.

According to the above-described configuration, the interfacial resistance of the battery 200 may be decreased.

With respect to the ratio "v1:(100−v1)" of the volume of the positive electrode active material 10 to the total volume of the first solid electrolyte 13 and the second solid electrolyte contained in the positive electrode 21, 30≤v1≤95 may be satisfied. Herein, v1 represents the volume ratio of the positive electrode active material 10 where the total volume of the positive electrode active material 10, the first solid electrolyte 13, and the second solid electrolyte contained in the positive electrode 21 is assumed to be 100. When 30≤v1 is satisfied, the energy density of the battery 200 can be sufficiently ensured. When v1≤95 is satisfied, the battery 200 may function with a high output.

The thickness of the positive electrode 21 may be greater than or equal to 10 μm and less than or equal to 500 μm. When the thickness of the positive electrode 21 is greater than or equal to 10 μm, the energy density of the battery 200 is sufficiently ensured. When the thickness of the positive electrode 21 is less than or equal to 500 μm, the battery 200 may function with a high output.

The electrolyte layer 22 is a layer containing an electrolyte. The electrolyte is, for example, a solid electrolyte. The solid electrolyte contained in the electrolyte layer 22 is defined as a third solid electrolyte. That is, the electrolyte layer 22 may include a third solid electrolyte layer.

A halide solid electrolyte, a sulfide solid electrolyte, an oxide solid electrolyte, a polymeric solid electrolyte, or a complex hydride solid electrolyte may be used as the third solid electrolyte. According to the above-described configuration, the output density of the battery 200 may be further improved.

The same halide solid electrolyte as the first solid electrolyte 13 and/or the second solid electrolyte described in the first embodiment may be used as the halide solid electrolyte. That is, electrolyte layer 22 may contain a halide solid electrolyte having the same composition as the composition of the first solid electrolyte 13 and/or the second solid electrolyte. According to the above-described configuration, the ionic conductivity of the third solid electrolyte is further improved. Consequently, the interfacial resistance of the battery 200 may be further decreased.

In this regard, the third solid electrolyte may be a halide solid electrolyte having a composition different from the compositions of the first solid electrolyte 13 and the second solid electrolyte. That is, the electrolyte layer 22 may contain a halide solid electrolyte having a composition different from the compositions of the first solid electrolyte 13 and the second solid electrolyte. According to the above-described configuration, the ionic conductivity of the third solid electrolyte is also improved. Consequently, the interfacial resistance of the battery 200 may be decreased.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. LiX, $Li_2O$, $MO_q$, $Li_pMO_q$, and the like may be added to the sulfide solid electrolyte. Herein, X represents at least one selected from the group consisting of F, Cl, Br, and I. M represents at least one selected from the group consisting of P, Si, Ge, B, Al, Ga, In, Fe, and Zn. p and q each represent a natural number. At least one sulfide solid electrolyte selected from the above-described materials may be used.

The sulfide solid electrolyte may contain lithium sulfide and phosphorus sulfide. The sulfide solid electrolyte may be $Li_2S$—$P_2S_5$.

$Li_2S$—$P_2S_5$ has high ionic conductivity and is stable to oxidation and reduction. Therefore, $Li_2S$—$P_2S_5$ being used as the third solid electrolyte enables a positive electrode material having a high electric potential, such as a Li-containing transition metal oxide, and a negative electrode material having a low electric potential, such as graphite or lithium metal, to be used. Consequently, the energy density of the battery 200 may be further improved.

Regarding the oxide solid electrolyte, for example, NASI-CON-type solid electrolytes represented by $LiTi_2(PO_4)_3$ and element-substituted products thereof, $(LaLi)TiO_3$-based perovskite-type solid electrolytes, LISICON-type solid electrolytes represented by $Li_{14}ZnGe_4O_{16}$, $Li_4SiO_4$, and $LiGeO_4$ and element-substituted products thereof, garnet-type solid electrolytes represented by $Li_7La_3Zr_2O_{12}$ and element-substituted products thereof, $Li_3N$ and H-substituted products thereof, $Li_3PO_4$ and N-substituted products thereof, and glass or glass ceramics in which $Li_2SO_4$, $Li_2CO_3$, or the like is added to a Li—B—O compound such as $LiBO_2$ or $Li_3BO_3$ serving as a base may be used. At least one oxide solid electrolyte selected from the above-described materials may be used.

Regarding the polymeric solid electrolyte, for example, a compound of a polymeric compound and a lithium salt may be used. The polymeric compound may have an ethylene oxide structure. The polymeric compound having an ethylene oxide structure can contain a large amount of lithium salt. Therefore, the ionic conductivity can be further increased. Regarding the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$ may be used. At least one lithium salt selected from the above-described lithium salts may be used.

Regarding the complex hydride solid electrolyte, for example, $LiBH_4$—LiI and $LiBH_4$—$P_2S_5$ may be used.

The electrolyte layer 22 may contain the third solid electrolyte as a primary component. That is, the electrolyte layer 22 may contain, for example, greater than or equal to 50% on a mass basis (that is, greater than or equal to 50% by mass) of the third solid electrolyte relative to the total electrolyte layer 22. According to the above-described configuration, the ionic conductivity in the interior of the electrolyte layer 22 is further improved. Consequently, the interfacial resistance of the battery 200 may be further decreased.

The electrolyte layer 22 may contain greater than or equal to 70% on a mass basis (that is, greater than or equal to 70% by mass) of the third solid electrolyte relative to the total electrolyte layer 22. According to the above-described configuration, the ionic conductivity in the interior of the electrolyte layer 22 is further improved. Consequently, the interfacial resistance of the battery 200 may be further decreased.

The electrolyte layer 22 may contain the third solid electrolyte as a primary component and may further contain incidental impurities or starting raw materials used when the third solid electrolyte is synthesized, by-products, decomposition products, and the like.

The electrolyte layer 22 may contain 100% on a mass basis (that is, 100% by mass) of the third solid electrolyte relative to the total electrolyte layer 22 except for incidentally included impurities. According to the above-described configuration, the ionic conductivity in the interior of the electrolyte layer 22 is further improved. Consequently, the interfacial resistance of the battery 200 may be further decreased.

As described above, the electrolyte layer 22 may be composed of only the third solid electrolyte.

The electrolyte layer 22 may contain at least two of the materials mentioned as the third solid electrolyte. For example, the electrolyte layer 22 may contain a halide solid electrolyte and a sulfide solid electrolyte.

The thickness of the solid electrolyte layer 22 may be greater than or equal to 1 μm and less than or equal to 300 μm. When the thickness of the solid electrolyte layer 22 is greater than or equal to 1 μm, a short-circuit between the positive electrode 21 and the negative electrode 23 does not readily occur. When the thickness of the solid electrolyte layer 22 is less than or equal to 300 μm, the interfacial resistance of the battery 200 may be further decreased. Consequently, the battery 200 can function with a high output.

The negative electrode 23 contains a material having characteristics of occluding and releasing metal ions (for example, lithium ions). The negative electrode 23 contains, for example, a negative electrode active material.

Regarding the negative electrode active material, metal materials, carbon materials, oxides, nitrides, tin compounds, silicon compounds, and the like may be used. The metal material may be a simple metal. The metal material may be an alloy. Examples of the metal material include a lithium metal and lithium alloys. Examples of the carbon material include natural graphite, coke, graphitizing carbon, carbon fiber, spherical carbon, artificial graphite, and amorphous carbon. Silicon (Si), tin (Sn), silicon compounds, and tin compounds being used enables the capacity density to be improved.

The negative electrode 23 may contain a solid electrolyte. The solid electrolytes exemplified as the third solid electrolyte constituting the electrolyte layer 22 may be used as the solid electrolyte. According to the above-described configuration, the ionic conductivity in the interior of the negative electrode 23 is improved. Consequently, the interfacial resistance of the battery 200 may be further decreased.

There is no particular limitation regarding the shape of the negative electrode active material according to the second embodiment. The shape of the negative electrode active material may be, for example, needlelike, spherical, ellipsoidal, or the like. For example, the shape of the negative electrode active material may be granular.

There is no particular limitation regarding the shape of the solid electrolyte contained in the negative electrode 23 according to the second embodiment. The shape of the solid electrolyte contained in the negative electrode 23 may be, for example, needlelike, spherical, ellipsoidal, or the like. For example, the shape of the solid electrolyte contained in the negative electrode 23 may be granular.

When the shape of the solid electrolyte contained in the negative electrode 23 is granular (for example, spherical), the median diameter of the solid electrolyte may be less than or equal to 100 μm. The median diameter of the solid electrolyte being less than or equal to 100 μm enables the negative electrode active material and the solid electrolyte to form a favorable dispersion state in the negative electrode 23. Consequently, the charge-discharge characteristics of the battery 200 are improved.

The median diameter of the solid electrolyte contained in the negative electrode 23 may be less than or equal to 10 μm or may be less than or equal to 1 μm. According to the above-described configuration, the negative electrode active material and the solid electrolyte can form a favorable dispersion state in the negative electrode 23.

The median diameter of the solid electrolyte contained in the negative electrode 23 may be less than or equal to the median diameter of the negative electrode active material. According to the above-described configuration, the negative electrode active material and the solid electrolyte can form a more favorable dispersion state in the negative electrode 23.

The median diameter of the negative electrode active material may be greater than or equal to 0.1 μm and less than or equal to 100 μm. The median diameter of the negative electrode active material being greater than or equal to 0.1 μm enables the negative electrode active material and the solid electrolyte to form a favorable dispersion state in the negative electrode 23. Consequently, the charge-discharge characteristics of the battery 200 are improved. The median diameter of the negative electrode active material being less than or equal to 100 μm sufficiently ensures the diffusion rate of lithium in the negative electrode active material. Consequently, the battery 200 can function with a high output.

The median diameter of the negative electrode active material may be greater than the median diameter of the solid electrolyte contained in the negative electrode 23. Consequently, the negative electrode active material and the solid electrolyte can form a favorable dispersion state.

With respect to the ratio "v2:(100−v2)" of the volume of the negative electrode active material to the solid electrolyte contained in the negative electrode 23, $30 \leq v2 \leq 95$ may be satisfied. Herein, v2 represents the volume ratio of the negative electrode active material where the total volume of the negative electrode active material and the solid electrolyte contained in the negative electrode 23 is assumed to be 100. When $30 \leq v2$ is satisfied, the energy density of the battery 200 can be sufficiently ensured. When $v2 \leq 95$ is satisfied, the battery 200 may function with a high output.

The thickness of the negative electrode 23 may be greater than or equal to 10 μm and less than or equal to 500 μm. When the thickness of the negative electrode 23 is greater than or equal to 10 μm, the energy density of the battery 200 is sufficiently ensured. When the thickness of the negative electrode 23 is less than or equal to 500 μm, the battery 200 may function with a high output.

To improve the adhesiveness between the particles, a binder may be contained in at least one selected from the group consisting of the positive electrode 21, the electrolyte layer 22, and the negative electrode 23. The binder is used to improve the bondability between the materials constituting the electrode. Examples of the binder include polyvinylidene fluorides, polytetrafluoroethylenes, polyethylenes, polypropylenes, aramid resins, polyamides, polyimides, polyamide-imides, polyacrylonitriles, polyacrylic acids, polyacrylic acid methyl esters, polyacrylic acid ethyl esters, polyacrylic acid hexyl esters, polymethacrylic acids, polymethacrylic acid methyl esters, polymethacrylic acid ethyl esters, polymethacrylic acid hexyl esters, polyvinyl acetates, polyvinylpyrrolidones, polyethers, polyether sulfones, hexafluoropolypropylenes, styrene-butadiene rubbers, and carboxymethyl celluloses. In addition, copolymers of at least two materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene may be used as the binder. In this regard, a mixture of at least two selected from the above-described materials may be used as the binder.

To improve the electron conductivity, at least one selected from the group consisting of the positive electrode 21 and the negative electrode 23 may contain a conductive additive. Regarding the conductive additive, for example, graphite such as natural graphite and artificial graphite, carbon black such as acetylene black and Ketjenblack, conductive fibers such as carbon fiber and metal fiber, metal powders of carbon fluoride, aluminum, and the like, conductive whiskers of zinc oxide, potassium titanate, and the like, conductive metal oxides such as titanium oxide, and conductive polymer compounds such as polyanilines, polypyrroles, and polythiophenes may be used. When the carbon conductive additive is used, a cost reduction can be performed.

Examples of the shape of the battery 200 according to the second embodiment include a coin type, a cylindrical type, a square type, a sheet type, a button type, a flat type, and a stacked type.

EXAMPLES

The present disclosure will be described below in detail with reference to the example and the comparative examples.

Example 1

Production of First Solid Electrolyte

In an argon glove box at a dew point of lower than or equal to −60° C., LiCl, LiBr, CaBr$_2$, YCl$_3$, and GdCl$_3$ serving as raw material powders were weighed at a molar ratio of LiCl:LiBr:CaBr$_2$:YCl$_3$:GdCl$_3$=0.256:0.461:0.026:0.154:0.103. The raw material powders were pulverized and mixed in a mortar. The resulting mixture was heat-treated by using a heat-treating furnace under conditions of 500° C. and 1 hour in a glove box at a dew point of lower than or equal to −60° ° C. Consequently, a powder of the first solid electrolyte of Example 1 was obtained. The first solid electrolyte of Example 1 had a composition of Li$_{2.8}$Ca$_{0.1}$Y$_{0.6}$Gd$_{0.4}$Br$_2$Cl$_4$ (hereafter expressed as LCYGBC).

Production of Second Solid Electrolyte

In an argon glove box at a dew point of lower than or equal to −60° C., LiCl, LiBr, and YCl$_3$ serving as raw material powders were weighed at a molar ratio of LiCl:LiBr:YCl$_3$=0.250:0.500:0.250. The raw material powders were pulverized and mixed in a mortar. The resulting mixture was heat-treated by using a heat-treating furnace under conditions of 500° C. and 1 hour in a glove box at a dew point of lower than or equal to −60° ° C. Consequently, a powder of the second solid electrolyte of Example 1 was obtained. The second solid electrolyte of Example 1 had a composition of Li$_3$Y$_1$Br$_2$Cl$_4$ (hereafter expressed as LYBC).

Production of Coated Active Material

Particles of Li(Ni,Co,Mn)O$_2$ (hereafter expressed as NCM) were used as the positive electrode active material. The produced second solid electrolyte was used as the coating material. In an argon glove box, the positive electrode active material and the second solid electrolyte were weighed at a mass ratio of 0.909:0.091. These materials were placed into a dry particle composing apparatus (NOB-MINI produced by Hosokawa Micron Corporation). A coating layer of the second solid electrolyte was formed on the surface of the positive electrode active material by performing compression shear treatment under conditions of a blade clearance of 2 mm and a treatment time of 60 min. Consequently, a coated active material of Example 1 was obtained.

Production of Positive Electrode Material

In an argon glove box at a dew point of lower than or equal to −60° C., the coated active material and the first solid electrolyte was weighed so that the ratio of the volume of the positive electrode active material (NCM) to the total volume of the first solid electrolyte (LCYGBC) and the second solid electrolyte (LYBC) was set to be 0.750:0.250. A positive electrode material of Example 1 was obtained by mixing these in an agate mortar.

Production of Third Solid Electrolyte

In an argon glove box at a dew point of lower than or equal to −60° C., Li$_2$S and P$_2$S$_5$ serving as raw material powders were weighed at a molar ratio of Li$_2$S:P$_2$S$_5$=0.750:0.250. The raw material powders were pulverized and mixed in a mortar. Thereafter, the resulting mixture was subjected to milling treatment by using a planetary ball mill (Model P-7 produced by Fritsch) under conditions of 12 hours and 500 rpm. Consequently, a glassy solid electrolyte was obtained. The resulting glassy solid electrolyte was heat-treated by using a heat-treating furnace under conditions of 270° ° C. and 2 hours in an argon glove box at a dew point of lower than or equal to −60° C. Consequently, glass ceramic Li$_2$S—P$_2$S$_5$ (hereafter expressed as LPS) serving as a sulfide solid electrolyte was obtained as the third solid electrolyte.

Production of Battery

The third solid electrolyte (LPS) in an amount of 94.0 mg was placed into an insulating tube having an inner diameter of 9.50 mm, and pressure molding was performed at a pressure of 80 MPa. Consequently, an electrolyte layer was produced.

The positive electrode material in an amount of 18.9 mg was placed onto one side of the electrolyte layer, and pressure molding was performed at a pressure of 720 MPa. Consequently, a positive electrode was produced.

Li metal foil having a thickness of 300 μm was stacked on the other side of the electrolyte layer, and a pressure of 80.0 MPa was applied. Consequently, a negative electrode was produced.

A collector composed of stainless steel was disposed on each of the positive electrode and the negative electrode, and a collecting lead was attached to each collector.

Finally, the insulating tube was tightly sealed using an insulating ferrule so that the interior of the tube was isolated from an external atmosphere. Consequently, a battery of Example 1 was obtained.

Comparative Example 1

Production of Positive Electrode Material

NCM serving as the positive electrode active material was used without being coated with the second solid electrolyte. The ratio of the volume of the positive electrode active material (NCM) to the volume of the first solid electrolyte (LCYGBC) of Example 1 was set to be 0.750:0.250. A positive electrode material of Comparative example 1 was obtained as in Example 1 except for the above.

Production of Battery

A battery of Comparative example 1 was obtained as in Example 1 except that the positive electrode material of Comparative example 1 was used.

Comparative Example 2

Production of Positive Electrode Material

The second solid electrolyte (LYBC) of Example 1 was used as the first solid electrolyte of Comparative example 2. The ratio of the volume of the positive electrode active material (NCM) to the total volume of the first solid electrolyte (LYBC) of Comparative example 2 and the second solid electrolyte (LYBC) was set to be 0.750:0.250. A positive electrode material of Comparative example 2 was obtained as in Example 1 except for the above.

Production of Battery

A battery of Comparative example 2 was obtained as in Example 1 except that the positive electrode material of Comparative example 2 was used.

Comparative Example 3

Production of Positive Electrode Material

The second solid electrolyte (LYBC) of Example 1 was used as the first solid electrolyte of Comparative example 3. NCM serving as the positive electrode active material was used without being coated with the second solid electrolyte. The ratio of the volume of the positive electrode active material (NCM) to the volume of the first solid electrolyte (LYBC) of Comparative example 3 was set to be 0.750: 0.250. A positive electrode material of Comparative example 3 was obtained as in Example 1 except for the above.

Production of Battery

A battery of Comparative example 3 was obtained as in Example 1 except that the positive electrode material of Comparative example 3 was used.

Comparative Example 4

Production of Coated Active Material

A coated active material of Comparative example 4 was obtained as in Example 1 except that the first solid electrolyte (LCYGBC) of Example 1 was used as the second solid electrolyte (coating material) of Comparative example 4.

Production of Positive Electrode Material

A positive electrode material of Comparative example 4 was obtained as in Example 1 except that the coated active material of Comparative example 4 was used as the positive electrode active material.

Production of Battery

A battery of Comparative example 4 was obtained as in Example 1 except that the positive electrode material of Comparative example 4 was used.

Comparative Example 5

Production of Positive Electrode Material

The second solid electrolyte (LYBC) of Example 1 was used as the first solid electrolyte of Comparative example 5. The coated active material of Comparative example 4 was used as the positive electrode active material. A positive electrode material of Comparative example 5 was obtained as in Example 1 except for the above.

Production of Battery

A battery of Comparative example 5 was obtained as in Example 1 except that the positive electrode material of Comparative example 5 was used.

Comparative Example 6

Production of Second Solid Electrolyte

In an argon glove box at a dew point of lower than or equal to $-60°$ C., LiCl and $YCl_3$ serving as raw material powders were weighed at a molar ratio of $LiCl:YCl_3=0.750:0.250$. The raw material powders were pulverized and mixed in a mortar. The resulting mixture was heat-treated by using a heat-treating furnace under conditions of $600°$ C. and 1 hour in a glove box at a dew point of lower than or equal to $-60°$ C. Consequently, a powder of the second solid electrolyte of Comparative example 6 was obtained. The second solid electrolyte of Comparative example 6 had a composition of $Li_3Y_1Cl_6$ (hereafter expressed as LYC).

Production of Coated Active Material

A coated active material of Comparative example 6 was obtained as in Example 1 except that the produced second solid electrolyte (LYC) was used as the coating material of Comparative example 6.

Production of Positive Electrode Material

A positive electrode material of Comparative example 6 was obtained as in Example 1 except that the coated active material of Comparative example 6 was used as the positive electrode active material.

Production of Battery

A battery of Comparative example 6 was obtained as in Example 1 except that the positive electrode material of Comparative example 6 was used.

Comparative Example 7

Production of Positive Electrode Material

The second solid electrolyte (LYBC) of Example 1 was used as the first solid electrolyte of Comparative example 7. The coated active material of Comparative example 6 was used as the positive electrode active material. A positive electrode material of Comparative example 7 was obtained as in Example 1 except for the above.

Production of Battery

A battery of Comparative example 7 was obtained as in Example 1 except that the positive electrode material of Comparative example 7 was used.

Measurement of Young's Modulus

Regarding LCYGBC, LYBC, and LYC used as the first solid electrolyte and the second solid electrolyte in the example and the comparative examples, Young's modulus was measured in the following procedure.

Young's modulus was calculated from a load-displacement curve measured using a nanoindenter (T1980 produced by Bruker). Table 1 presents calculated Young's modulus.

Charge-Discharge Test

The battery of each of the example and the comparative examples was subjected to a charge-discharge test under the following conditions, and the charge capacity and the dis-
charge capacity in the initial state were measured.

Initially, the battery was arranged in a constant-tempera-
ture bath at 25° C.

The battery was charged at a current density of 147
μA/cm² until the positive electrode reached a voltage of 4.30
V relative to the negative electrode. The current density
corresponds to a 0.05 C-rate (20-hour rate) with respect to
the theoretical capacity of the battery. Charge means the
state in which a current flows in the direction of lithium ions
moving from the positive electrode containing NCM to the
Li metal (that is, negative electrode).

Subsequently, the battery was discharged at a current
density of 147 μA/cm² until the positive electrode reached a As illustrated by the Cole-Cole plot in FIG. 4, the resis-
tance component is roughly divided into three parts: the
resistance up to a point $R_{i1}$ (bulk resistance), the resistance
between the point $R_{i1}$ and a point $R_{i2}$ (charge movement
resistance), and the resistance between the point $R_{i2}$ and the
point $R_{i3}$ (ion diffusion resistance). The resistance between
the point $R_{i1}$ and a point $R_{i2}$, that is, a difference in the real
number between the point $R_{i1}$ and the point $R_{i2}$, is assumed
to be the interfacial resistance of the battery. The interfacial
resistance $R_i$ of the battery was calculated using the real
numbers of the point $R_{i1}$ and a point $R_{i2}$ from the Cole-Cole
plot of each of the example and the comparative examples
on the basis of the following Equation (1):

$$R_i = R_{i2} - R_{i1}$$

Equation (1).

TABLE 1

| | First solid electrolyte | Young's modulus of first solid electrolyte [GPa] | Second solid electrolyte (coating layer) | Young's modulus of second solid electrolyte [GPa] | Discharge capacity [mAh] | Initial charge-discharge efficiency | Interfacial resistance [Ω] |
|---|---|---|---|---|---|---|---|
| Example 1 | LCYGBC | 40.5 | LYBC | 12.3 | 2.32 | 0.899 | 17.6 |
| Comparative example 1 | LCYGBC | 40.5 | None | — | 2.30 | 0.888 | 23.3 |
| Comparative example 2 | LYBC | 12.3 | LYBC | 12.3 | 2.36 | 0.906 | 37.1 |
| Comparative example 3 | LYBC | 12.3 | None | — | 2.37 | 0.905 | 43.0 |
| Comparative example 4 | LCYGBC | 40.5 | LCYGBC | 40.5 | 1.71 | 0.489 | 1460 |
| Comparative example 5 | LYBC | 12.3 | LCYGBC | 40.5 | 0.309 | 0.160 | 1920 |
| Comparative example 6 | LCYGBC | 40.5 | LYC | 42.1 | 2.39 | 0.930 | 78.0 |
| Comparative example 7 | LYBC | 12.3 | LYC | 42.1 | 2.15 | 0.902 | 75.7 | voltage of 2.50 V relative to the negative electrode. The
current density corresponds to a 0.05 C-rate (20-hour rate)
with respect to the theoretical capacity of the battery. Dis-
charge means the state in which a current flows in the
direction of lithium ions moving from the Li metal (that is,
negative electrode) to the positive electrode containing
NCM.

The ratio of the discharge capacity to the charge capacity
in the initial state was calculated as the initial charge-
discharge efficiency. Table 1 presents the results.

Figure 3:
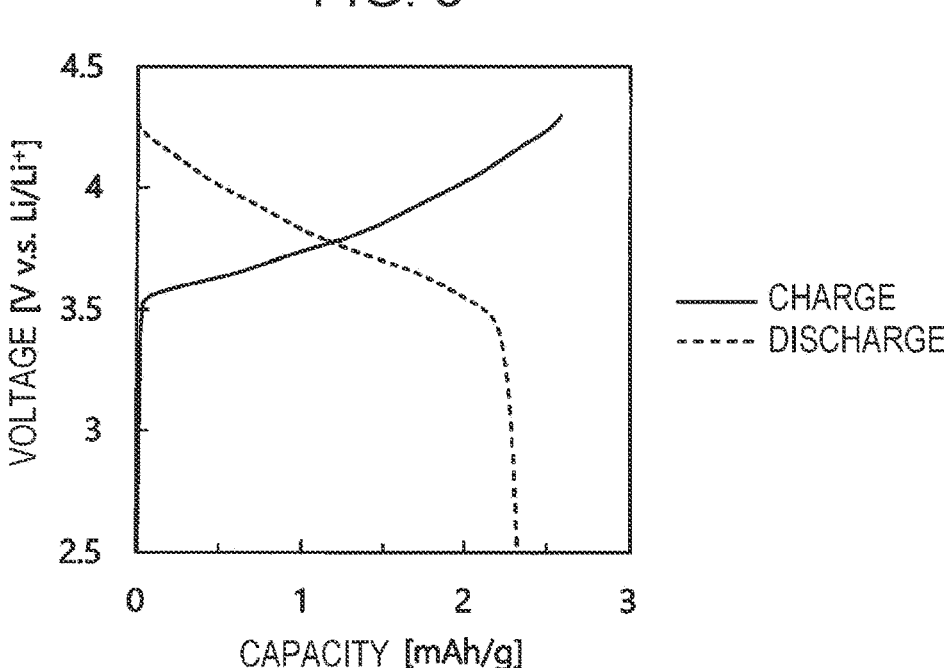
FIG. 3 is a graph illustrating the charge-discharge characteristics in the initial state of the battery of Example 1.

FIG. 3 is a graph illustrating the charge-discharge char-
acteristics in the initial state of the battery of Example 1. In
FIG. 3, the vertical axis represents the voltage, and the
horizontal axis represents the charge capacity or the dis-
charge capacity. In FIG. 3, the solid line indicates the
instance of charge and the broken line indicates the instance
of discharge.

Measurement of Interfacial Resistance

Regarding the battery of each of the example and the
comparative examples, the interfacial resistance was mea-
sured by an electrochemical impedance measuring method.
A potentiostat incorporated with a frequency response ana-
lyzer (VSP-300 produced by Biologic) was used for the
measurement. The measurement temperature was 25° C.

Figure 4:
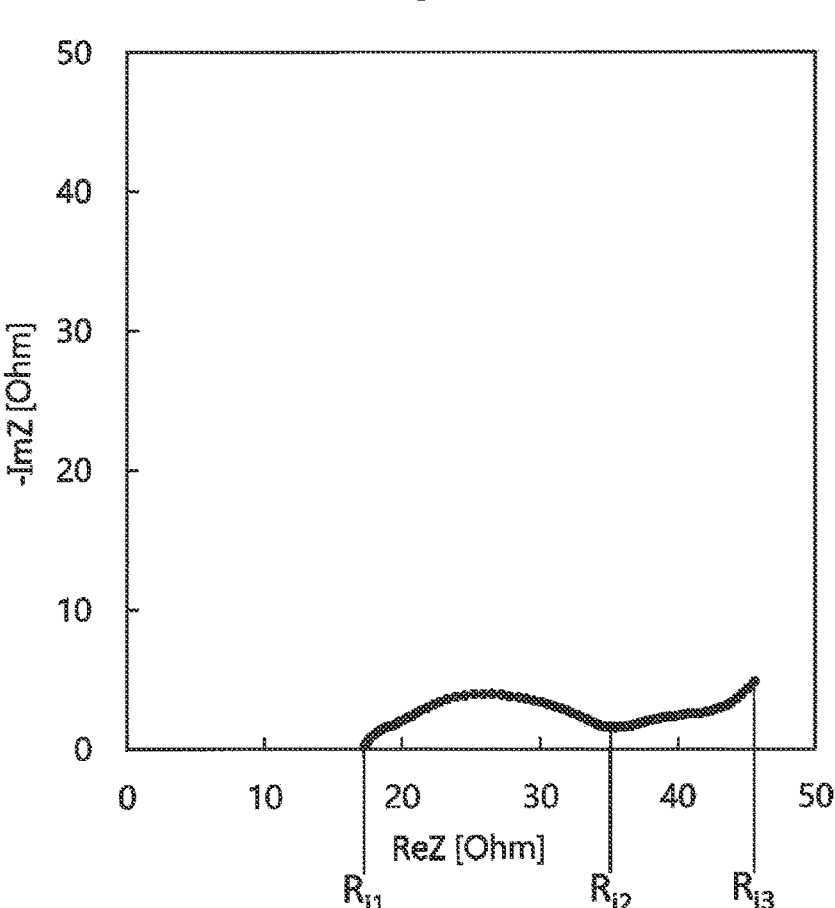
FIG. 4 is a graph illustrating the Cole-Cole plot obtained by the impedance measurement of the battery after charge in Example 1.

FIG. 4 is a graph illustrating the Cole-Cole plot obtained
by the impedance measurement of the battery after charge in
Example 1. In FIG. 4, the vertical axis represents the
imaginary part of the impedance, and the horizontal axis
represents the real part of the impedance.

CONSIDERATION

In Example 1, the halide solid electrolyte having lower
Young's modulus than the halide solid electrolyte of the first
solid electrolyte, that is, being soft, was used as the second
solid electrolyte (coating layer). The interfacial resistance of
the battery of Example 1 was lower than the interfacial
resistance of batteries of Comparative examples 1 to 7. In
particular, in Example 1, the interfacial resistance was low
compared with Comparative examples 1 and 3 in which no
halide solid electrolyte was included as the second solid
electrolyte (coating layer). In addition, in Example 1, the
interfacial resistance was low compared with Comparative
examples 2 and 4 in which the same halide solid electrolyte
was used as the first solid electrolyte and the second solid
electrolyte (coating layer). In particular, the interfacial resis-
tance of Example 1 was significantly low compared with
Comparative example 4 in which the halide solid electrolyte
having Young's modulus of greater than 40 GPa was used as
the first solid electrolyte and the second solid electrolyte
(coating layer). Further, in Example 1, the interfacial resis-
tance was low compared with Comparative examples 5 to 7
in which the halide solid electrolyte having higher Young's
modulus than the halide solid electrolyte of the first solid
electrolyte, that is, being hard, was used as the second solid
electrolyte. In particular, the interfacial resistance of
Example 1 was significantly low compared with Compara-
tive example 5 in which LYBC was used as the first solid
electrolyte and LCYGBC was used as the second solid
electrolyte (coating layer). The reason for this is conjectured that, in Example 1, the second solid electrolyte (coating layer) softer than the first solid electrolyte playing the role of a paste which bonds the first solid electrolyte to the positive electrode active material increases the contact area between the positive electrode active material and the first solid electrolyte.

The battery according to the present disclosure may be used as, for example, an all-solid-state lithium secondary battery.

What is claimed is:

1. A positive electrode material comprising:
a coated active material including a positive electrode active material and a coating layer, and
a first solid electrolyte,
wherein the coating layer contains a second solid electrolyte and covers at least a portion of a surface of the positive electrode active material,
the first solid electrolyte is represented by the following Formula (2):

$$Li_{6-2a-3d}Ca_a(Y_{1-b}Gd_b)_dBr_{6-c}Cl_c \qquad \text{Formula (2)}$$

wherein Formula (2) satisfies $0<a<0.75$, $0.8\leq b<1$, $0<c<6$, and $0<d<1.5$, and
the Young's modulus of the second solid electrolyte is lower than the Young's modulus of the first solid electrolyte.

2. The positive electrode material according to claim 1, wherein Formula (2) satisfies $0.01\leq a\leq0.3$.

3. The positive electrode material according to claim 2, wherein Formula (2) satisfies $a\leq0.2$.

4. The positive electrode material according to claim 1, wherein Formula (2) satisfies $0.8\leq b\leq0.9$.

5. The positive electrode material according to claim 1, wherein Formula (2) satisfies $1.0\leq c\leq1.2$.

6. The positive electrode material according to claim 1, wherein the Young's modulus of the second solid electrolyte is less than or equal to 40 GPa.

7. The positive electrode material according to claim 1, wherein the second solid electrolyte is represented by the following Formula (3);

$$Li_{\delta1}M2_{\epsilon1}X2_{\zeta1} \qquad \text{Formula (3)}$$

where $\delta1$, $\epsilon1$, and $\zeta1$ each independently represent a positive real number,
M2 includes at least one element selected from the group consisting of semimetal elements and metal elements other than Li, and X2 includes at least one selected from the group consisting of F, Cl, Br, and I.

8. The positive electrode material according to claim 7, wherein the second solid electrolyte is represented by the following Formula (4):

$$Li_{3-3e}Y_{1+e}Cl_{6-f-g}Br_fI_g \qquad \text{Formula (4)}$$

wherein Formula (4) satisfies $-1<e<1$, $0\leq f\leq6$, $0\leq g\leq6$, and $(f+g)\leq6$.

9. The positive electrode material according to claim 8, wherein Formula (4) satisfies $2\leq f\leq3$ and $g=0$.

10. The positive electrode material according to claim 8, wherein Formula (4) satisfies $f=0$ and $g=0$.

11. The positive electrode material according to claim 8, wherein Formula (4) satisfies $0\leq e\leq0.1$.

12. The positive electrode material according to claim 1, wherein the positive electrode active material contains Ni, Co, and one of Mn or Al.

13. A battery comprising:
a positive electrode containing the positive electrode material according to claim 1;
a negative electrode; and
an electrolyte layer disposed between the positive electrode and the negative electrode.

14. A positive electrode material comprising:
a coated active material including a positive electrode active material and a coating layer; and
a first solid electrolyte,
wherein the coating layer contains a second solid electrolyte and covers at least a portion of a surface of the positive electrode active material,
the first solid electrolyte is represented by the following Formula (2):

$$Li_{6-2a-3d}Ca_a(Y_{1-b}Gd_b)_dBr_{6-c}Cl_c \qquad \text{Formula (2)}$$

wherein Formula (2) satisfies $0<a<0.75$, $0<b<1$, $1.0\leq c\leq1.2$, and $0<d<1.5$, and
the Young's modulus of the second solid electrolyte is lower than the Young's modulus of the first solid electrolyte.

15. A battery comprising:
a positive electrode containing the positive electrode material according to claim 14;
a negative electrode; and
an electrolyte layer disposed between the positive electrode and the negative electrode.

* * * * *